United States Patent [19]

Beals

[11] Patent Number: 4,531,775
[45] Date of Patent: Jul. 30, 1985

[54] LOAD BEARING SECURITY COVER FOR PICK UP TRUCK

[76] Inventor: Tom C. Beals, 920 Fuchsia La., Carlsbad, Calif. 92008

[21] Appl. No.: 588,157

[22] Filed: Mar. 12, 1984

[51] Int. Cl.³ .............................................. B60P 7/00
[52] U.S. Cl. ..................................... 296/100; 296/10; 296/26; 296/27; 296/37.6; 220/22.3; 108/12
[58] Field of Search .................................... 296/10–14, 296/26, 27, 32, 37.6, 40, 100, 37.5, 37.1; 220/22.1, 22.3; 108/12, 18, 60; 312/324; 211/184

[56] References Cited

U.S. PATENT DOCUMENTS 2,771,319  11/1956  Renquist .............................. 296/100
3,069,199  12/1962  Reardon et al. ..................... 296/100
3,841,690  10/1974  Piercy ................................... 296/10
4,284,303   8/1981  Hather ................................. 296/100

Primary Examiner—Robert B. Reeves
Assistant Examiner—Dennis H. Pedder
Attorney, Agent, or Firm—John J. Murphey

[57] ABSTRACT

A load bearing security cover for the bed of a pick up truck comprising a pair of doors folded flat together and mounted on top of the bed side walls to form a lockable storage area underneath and openable to extend the sides of the pick up bed upward to hold voluminous cargo including a center support plank that doubles as a front wall extension and a rear transverse support arm over the tail gate that doubles as a brace for the doors in their open configuration.

7 Claims, 5 Drawing Figures

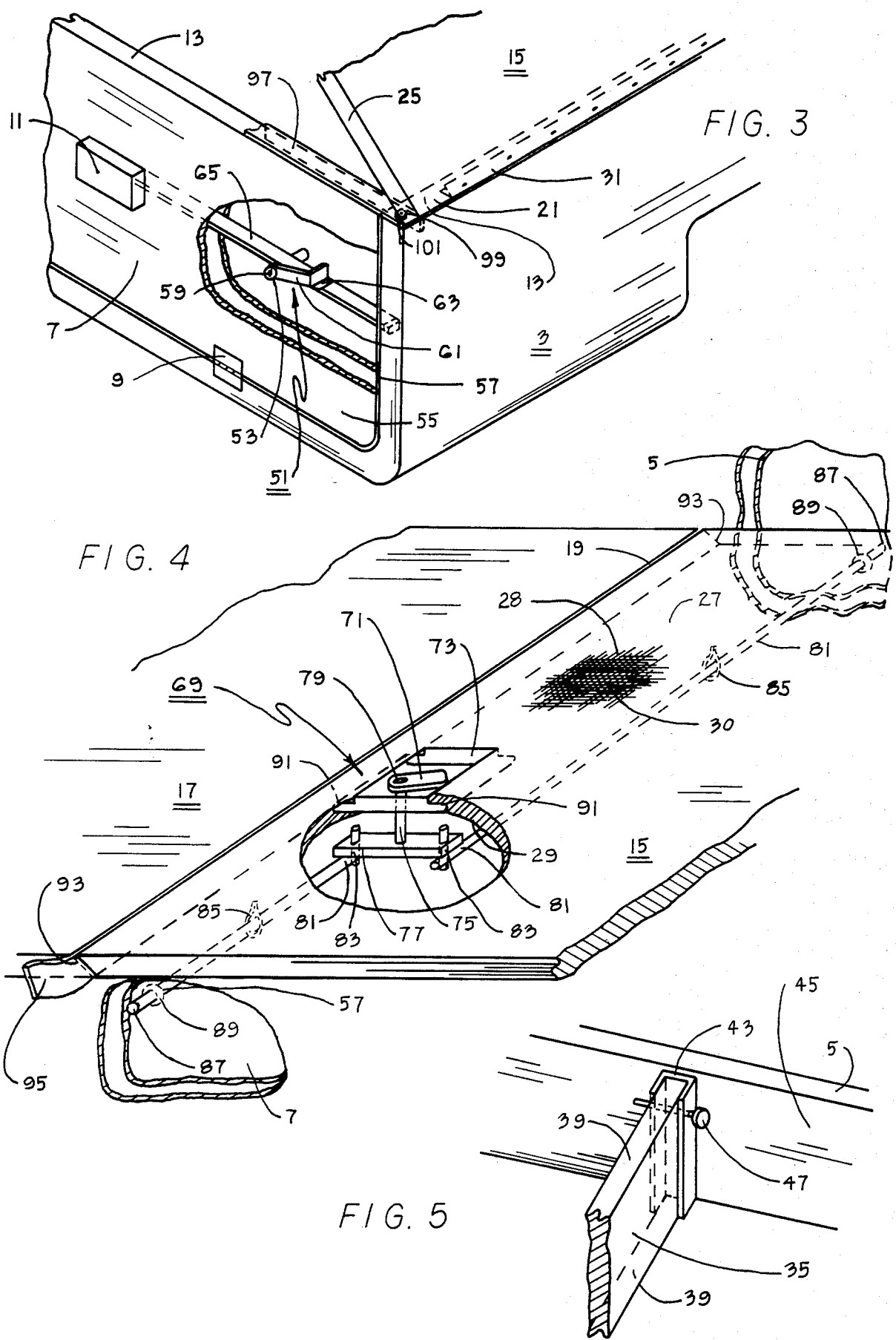

LOAD BEARING SECURITY COVER FOR PICK UP TRUCK

FIELD OF THE INVENTION

This invention pertains to light duty utility vehicles commonly known as pick up trucks. They are known as having an open rear cargo area defined by a flat bed surrounded by a pair of spaced-apart vertical side walls extending upward therefrom, a transverse upstanding front wall, just behind the truck cab, and an upstanding rear tail gate, usually hinged at the bottom to swing outward into a loading position.

DESCRIPTION OF THE PRIOR ART

The pick up truck open cargo area is used to haul various objects, however, said objects are exposed to adverse weather conditions and to theft. The weather problem may be readily cured by covering the cargo with a tarpaulin; however, this does not preclude theft. Numerous attempts have been made to provide a secure cover therefor, such as shown in U.S. Pat. No. 3,069,199 to James A. Reardon. Such attempts have provided security and weather protection but only at the expense of a severe reduction in cargo carrying capacity, i.e., the cover is too low to allow hauling of tall cargo or the cover itself is incapable of supporting a load. In addition, no attention is given to the problem created by closing over the top of the cargo area and what effect that has on the ability to enter the enclosed cargo area without removing the newly installed cover. Further, dropping the tail gate of a covered cargo area that has cargo loaded on top or it creates the problem of having that support removed, thus allowing the cover to sag and inhibiting re-closing of the tail gate.

Many times a pick up truck owner is called upon to haul a cargo that is voluminous instead of heavy, such as bags of dead leaves or firewood. Pick up trucks have very limited volumetric capacity due to their low sides. In this situation it is desired to raise the sidewalls to permit stacking of the cargo. While placing tall panels along the walls will increase the cargo compartment such methods create unstable conditions in the truck and wind, cargo shifting or just making sharp turns will cause these panels to shift allowing cargo to spill out and pose a serious traffic hazard. Attempts to provide rigid side wall extensions on pick up trucks, such as U.S. Pat. No. 3,841,690 to Paul L. Piercy and U.S. Pat. No. 4,284,303 to Robert K. Hather, involve numerous panels, torsion bars, spring bars, interlocking rods, and otherwise very complicated structures that are time-consuming to assemble.

In addition, many of these structures rise above the pick up truck bed or side walls, when not in use, and obscure the driver's rear view of the road from the inside rear view mirror forcing him or her to use the side mirrors with their restricted field of view.

SUMMARY OF THE INVENTION

This invention comprises a load bearing security cover for the cargo area of a pick up truck that uses relatively few parts and is easily and readily assembled by one person. The cover is as strong as the bed itself and can hold heavy cargo without damage. The cover is lockable to prevent theft and is weatherproof to protect the enclosed cargo. A second lock is provided to enable the tail gate to be locked and unlocked for selective entrance to the cargo area to put in or take out additional cargo without having to disturb the cover or the cargo loaded on top of it. The enclosed cargo area is secure yet open to the air sufficient to double as a safe sleeping place.

The cover is capable of being easily opened to raise the side walls in the vertical direction for use with high volume cargo. A support is provided between the truck bed and the cover that is repositional to above the front wall in the open-cover configuration to provide substantial rigidity to the side walls and thus alleviating the extended wall flexibility problem previously described.

In addition, the cover of this invention lays flat on the top of the pick up truck bed side and end walls thus allowing full rear view of the road from the inside rear view mirror.

Accordingly, the main object of this invention is to provide a cover for the cargo area of a pick up truck to enclose and protect that area from adverse weather and theft and yet retain the load-carrying capacity of said vehicle by coupling a load-bearing capability to said cover. Other objects include a load-bearing security cover that allows select entrance to the enclosed cargo space through the tail gate; a cover that can be readily opened to increase the height of the side walls and front wall for accepting high volume cargo; a cover whose load bearing support, in the closed configuration, becomes part of the increase in cargo area in the open configuration; a cover that in the closed configuration allows full use of the cab rear view mirror: and, a security cover that is weather resistant yet forms a liveable area within the enclosed cargo compartment.

These and other objects of this invention will become more apparent when the following detailed description of the preferred embodiment is read along with the drawings provided. The scope of protection sought by the inventor may be determined by reading the claims that are appended hereto.

BRIEF DESCRIPTION OF THE DRAWINGS

FIG. 3 is a close up view of the right rear corner of the pick up truck showing one embodiment of the tail gate locking means.

FIG. 4 is a close up view of the handle on the cover.

FIG. 5 is a close up view of one embodiment of the third panel support member located in the front wall of the pick up truck.

DESCRIPTION OF THE PREFERRED EMBODIMENT

Figure 1:
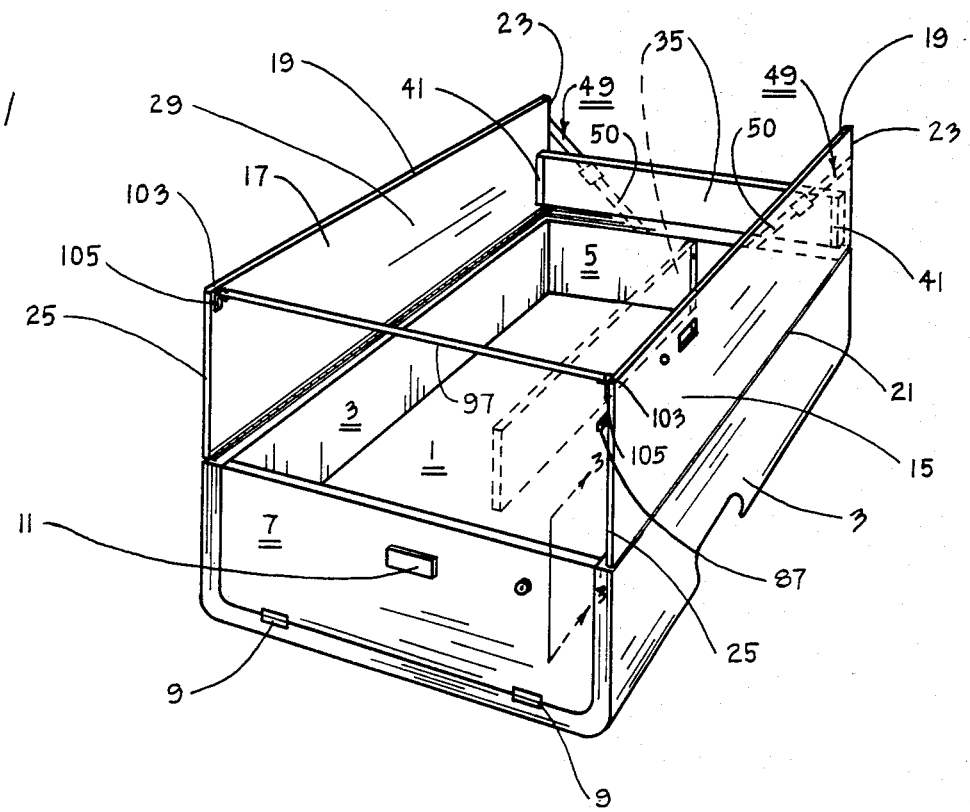
FIG. 1 is a perspective view of the cover of this invention showing it in the open configuration.
Figure 2:
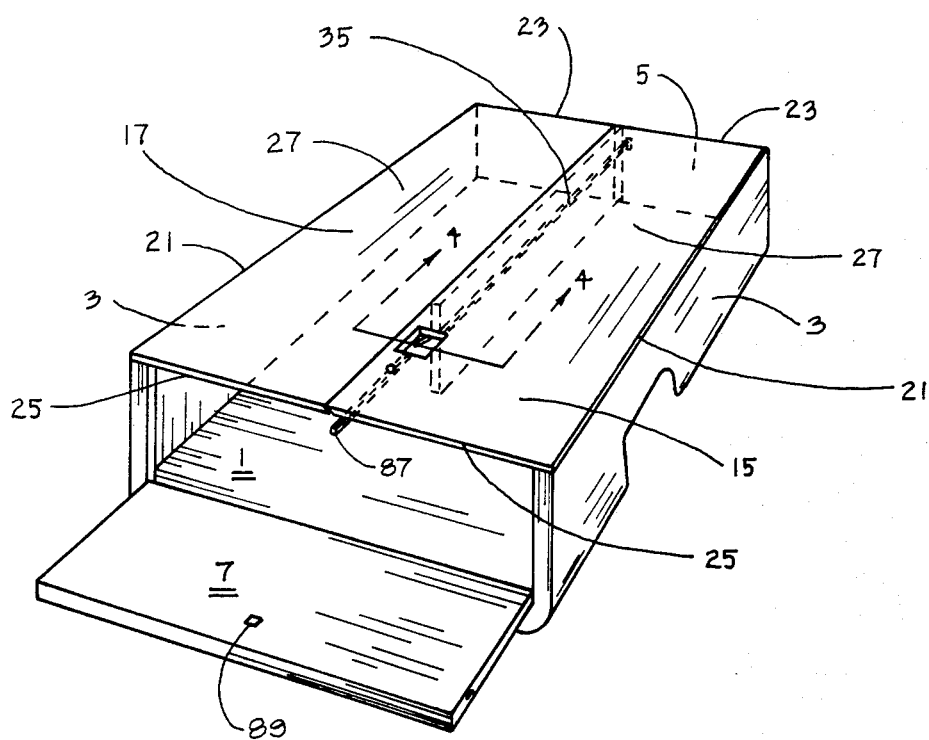
FIG. 2 is a perspective view of the cover in the closed configuration.

FIG. 1 shows the cover of this invention mounted on a typical pick up truck, said truck comprising a substantially elongated rectangular bed 1 surrounded by a pair of spaced-apart parallel vertical side walls 3 extending upward therefrom, an upstanding front wall 5 transverse to side walls 3 and usually rearward of the truck cab (not shown) and finally, a rear tail gate 7. Gate 7 is usually mounted on bed 1 at hinges 9 and is adapted to be lowered from a vertical "closed" position (FIG. 1) to an outward, horizontal "open" position (FIG. 2) through the use of a tail gate handle 11. Bed 1, walls 3 and 5 and tail gate 7 are usually made of a closely spaced double wall construction (see FIG. 3) separated along the top edges by an edge plate 13 that spans the closely spaced terminal edges of each wall.

In FIG. 1 the cover of this invention is shown as first and second rigid flat panels 15 and 17 respectively, each of which is defined by mutually parallel inner edges 19 and outer edges 21, forward edges 23, rearward edges 25, and parallel top and bottom surfaces 27 and 29 respectively. Panels 15 and 17 should be made of strong, generally inflexible material such as thick plywood and top panel surface 27, and preferably both top and bottom surfaces 27 and 29, be covered with an abrasion resistant material such as a layer of woven fiber glass cloth 28 with an overlay of cross-linked epoxy resin 30, products that are already known and available on the market.

Outer edges 21 of first and second panels 15 and 17 are pivotally attached along the top of respective side walls 3 at edge plate 13 by the use of an elongated hinge such as a commonly known piano hinge 31. Such attachment allows panels 15 and 17 to be swung from a vertically upward open position (FIG. 1) down toward each other, in a 90° arc, to a closed position (FIG. 2) wherein said inner edges 19 meet to form a continuous, flat planar surface encompassing both said panels that rests on top of edge plate 13 that encloses the upper edge of side walls 3, front walls 5 and tail gate 7 thus covering bed 1 and defining an enclosed cargo compartment 33.

A third panel 35 of a length generally equal to the width of front wall 5 and a width generally equal to the height of front wall 5 is provided having ends 37 and parallel sides 39. Panel 35 should be of very stiff construction such as thick lumber or plywood, however its surface need not be made abrasion resistant. In the open configuration panel 35 is mounted above front wall 5 spanning bottom panel surfaces 29 on each of first panel 15 and second panel 17 to provide rigidity and positioning support to the open configuration. Panel 35 may be conveniently retained in this position by having its ends 37 forced down into a pair of spaced-apart U-shaped channels 41 that are mounted, facing each other, to the bottom panel surfaces 29 on each of first panel 15 and second panel 17 near the panels' forward edge 23, as shown in FIG. 1.

In the closed configuration, panel 35 is moved to near the middle of bed 1 and laid along bed 1 upright such that its sides 39 span bed 1 and bottom panel surface 29, preferably along the junction between inner panel edges 19. Such a position provides strong load-bearing support to the cover. The forward panel end 37 may be conveniently supported in the vertical position by inserting it in a U-shaped channel 43 that is vertically mounted on the bed-facing surface 45 of front wall 5 facing the bed and held in said position in channel 43 by means of a cross-pin 47 passing transversely through aligned apertures (not shown) in channel 43 and panel end 37.

A pair of first movement assistance means 49, such as spring loaded foldable braces 50 are connected between front wall 5, near end plate 13, and forward edge 23 of each of panels 15 and 17 to assist in opening and closing said panels. A fluid-filled, spring-loaded piston, as is commonly mounted on the "hatchback" of small economy cars is very useful in this regard.

A second means 51 for providing select and controllable entrance to enclosed cargo compartment 33 is located on tail gate 7 and includes a rotatable key lock 53 mounted between tail gate walls 55 and 57 having its exposed lock-inserting face 59 facing rearward of tail gate 7 and having a lock arm 61 extending radially therefrom, between walls 55 and 57 to engage a cutout 63 formed in tail gate opening rod 65. Upon engagement with cutout 63 (i.e., "locking") tail gate handle 11 will not be able to move rod 65 transversely out of engagement with locking aperture 67 in side wall 3 thus providing a fully secure cargo compartment 33. Reverse rotation of lock 53 (i.e., "unlocking") will permit arm 65 to move out of apertures 67 allowing tail gate 7 to be opened.

A third means 69 is provided on first panel 15 for locking panel 15 in a closed, flat and secure position on top of front wall 5 and tail gate 7. Means 69 comprises an exposed handle 71, mounted in a depression 73 formed in top panel surface 27, on a turnable shaft 75 of finite length passing through panel 15 terminating at a short transverse arm 77 mounted adjacent bottom panel surface 29. A lock 79 is attached to handle 71 and shaft 75, in a well-known manner, to permit locking and unlocking thereof. A pair of elongated locking rods 81 are pivotally attached to ends 83 of arm 77, such as by cotter pins, etc., and extend therefrom in mutually opposite directions along said bottom panel surface 29, through guide hooks 85, in a path generally parallel to inner panel edge 19 and terminating at ends 87 that extend through apertures 89, formed in front wall 5 and tail gate interior wall 57, for locking and unlocking engagement therewith as handle 71 is turned. Depression 73 may include underside openings 91 formed in the lower part of the sides thereof to aid in grasping first panel 15 during opening and closing thereof.

To aid in the locking feature of third means 69, inner panel edges 19 may be mutually beveled as shown at 93 in an overlapping configuration such that the locking of first panel 15 in the closed position prevents opening of second panel 17. To make the cover fully weather proof, a strip 95 of weather stripping may be carried on one or both inner panel edges 19 held thereto by glue or other known means.

An elongated brace 97 such as angle iron, may be installed along the top of but not attached to tail gate 7 spanning edge plates 13 at the rear corner of both side walls 3 and anchored thereto by removable pins 99 inserted in mating apertures 101 in edge plates 13 (see FIG. 3). Strap 97 will aid in preventing sag in the cover when cargo is set atop panels 15 and 17 when tail gate 7 is opened. In addition, in the open configuration, strap 97 may be unpinned from atop edge plate 13 and raised horizontally to the uppermost rear corners 103 of panels 15 and 17, i.e., where their inner edges 19 meet with their respective rear edges 25, and repinned in angle brackets 105. By this means, more rigidity and stabilization is given the opened configuration.

What is claimed is:

1. In a pick up truck comprising a flat bed, spaced-apart vertical side walls extending upward therefrom, a transverse upstanding front wall and rear tail gate, said tail gate adapted for lowering from a vertical position outward to a horizontal position, defining a cargo compartment, an openable load-bearing security cover therefor comprising:

(a) first and second rigid flat panels defined by inner and outer edges, forward and rearward edges and upper and lower surfaces, said outer edges pivotally attached along the top of the side walls to permit said panels to be swung from a vertical upward open position down toward each other to a closed position where said inner edges meet to form a continuous flat planar surface encompassing both said panels that rests on top of the walls and tail gate parallel to the bed to define a totally enclosed cargo compartment;

(b) a third stiff panel adapted for vertical positioning between the bed and said closed first and second panels with sides of the third panel in contact with the flat bed and the closed first and second panels to provide load bearing support thereto, said third panel movable to a transverse position between said first and second panels in their vertically open position to provide rigidity to the open panel configuration;

(c) first means connected between the front wall and each said first and second panel to assist in opening and closing said panels;

(d) second means including a lock in the tail gate to allow locking and unlocking thereof for controllable access to the enclosed cargo compartment; and, (e) third means for locking said panels into a closed, flat position on top of the walls and tail gate comprising:
  (1) a lockable exposed handle mounted flush to said panel top surface in a depression formed therein;
  (2) a turnable shaft connecting said handle through said panel to an arm adjacent said panel bottom surface; and,
  (3) a pair of elongated rods extending from said arm in opposite directions along said bottom surface and parallel to said panel inner edge terminating at ends that extend through opposite apertures formed in the front wall and tail gate for locking and unlocking engagement therewith when said arm is rotated by said handle, said inner edges of said first and second panels adapted to engage in an interlocking manner such that locking of said first panel in the closed position prevents opening of said second panel.

2. The cover of claim 1 wherein said inner edges of said first and second panels are beveled at mutually opposite angles such that said beveled edge of said lockable panel overlays said beveled edge of said other panel to prevent opening when locked and including a waterproofing gasket between said beveled edges.

3. The cover of claim 1 wherein said first and second panels are covered with glass cloth and a compatible resin to provide enchanced strength and wearability thereto.

4. The cover of claim 1 including a U-shaped channel member mounted on the front wall facing the cargo compartment for receipt therein of one end of said third panel to provide positioning support thereto when said first and second panels are in the closed configuration.

5. The cover of claim 1 including a pair of spaced-apart U-shaped channels mounted on the lower surfaces of said first and second panels near the forward edges thereof for receipt therein of the terminal ends of said third panel to provide positioning support thereto when said first and second panels are in the open configuration.

6. The cover of claim 1 wherein said second means includes an arm, connected to said lock, for rotation into and out of interference with the movement of a tail gate opening mechanism.

7. The cover of claim 1 including an elongated brace spanning the side walls and atop the tail gate to provide support for said cover in the closed configuration and to be relocatable to transversely span the upper rearward corners of said panels in the open configuration to provide rigidity thereto.

* * * * *